(12) United States Patent
Blevins

(10) Patent No.: US 7,519,976 B2
(45) Date of Patent: *Apr. 14, 2009

(54) COLLABORATIVE BUSINESS PLUG-IN FRAMEWORK

(75) Inventor: Mike Blevins, Volcano, CA (US)

(73) Assignee: Bea Systems, Inc., Redwood Shores, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 10/404,552

(22) Filed: Apr. 1, 2003

(65) Prior Publication Data

US 2004/0221261 A1 Nov. 4, 2004

Related U.S. Application Data

(60) Provisional application No. 60/376,906, filed on May 1, 2002.

(51) Int. Cl.
*G06F 9/44* (2006.01)
*G06F 7/00* (2006.01)
*G06Q 10/00* (2006.01)

(52) U.S. Cl. .................. 719/328; 719/318; 719/331; 717/100; 707/100; 705/1

(58) Field of Classification Search ......... 709/201–207, 709/217–219; 715/764–767; 719/311–318, 719/328, 331; 717/100–123; 705/1–11; 707/1–10, 100

See application file for complete search history.

(56) References Cited

U.S. PATENT DOCUMENTS 5,321,841 A    6/1994  East et al. .................. 395/725
5,469,562 A   11/1995  Saether
5,604,860 A    2/1997  McLaughlin et al.
5,612,865 A    3/1997  Dasgupta .................. 364/184
5,630,131 A    5/1997  Palevich et al.
5,748,975 A    5/1998  Van De Vanter ............ 395/793
5,801,958 A    9/1998  Dangelo et al.
5,835,769 A   11/1998  Jervis et al. ................. 395/701
5,836,014 A   11/1998  Faiman
5,862,327 A    1/1999  Kwang et al. ............... 395/200
5,867,822 A    2/1999  Sankar (Continued)

OTHER PUBLICATIONS

Blake, Ruled-Driven Coordination Agent: "A Self-Configureable Agent Architecture for Distributed Control"; IEEE Mar. 2001, pp. 271-277.
Dahalin et al., Workflow Interoperability Using Extensible Markup Language (XML), IEEE, Jul. 2002, pp. 513-516.

(Continued)

*Primary Examiner*—Meng-Ai An
*Assistant Examiner*—Charles E Anya
(74) *Attorney, Agent, or Firm*—Fliesler Meyer LLP

(57) ABSTRACT

A plug-in framework can be used in an integration system to extend business process management functionality. A plug-in manager, which can be part of an integration process engine, is used to support configuration, design, and run-time management of the plug-ins. A plug-in API is used to provide support for configuration, design, and run-time interactions between the process engine and a deployed plug-in. The plug-in API can consist of components such as session beans, run-time management classes, and packages.

This description is not intended to be a complete description of, or limit the scope of, the invention. Other features, aspects, and objects of the invention can be obtained from a review of the specification, the figures, and the claims.

27 Claims, 6 Drawing Sheets

U.S. PATENT DOCUMENTS

| | | |
|---|---|---|
| 5,933,838 A | 8/1999 | Lomet .................. 707/202 |
| 5,944,794 A | 8/1999 | Okamoto et al. |
| 5,961,593 A | 10/1999 | Gabber et al. ............... 709/219 |
| 5,966,535 A | 10/1999 | Benedikt et al. |
| 5,991,804 A | 11/1999 | Bolosky et al. ............. 709/221 |
| 6,012,083 A | 1/2000 | Savitzky et al. |
| 6,016,495 A | 1/2000 | McKeehan et al. |
| 6,018,730 A | 1/2000 | Nichols et al. |
| 6,023,578 A | 2/2000 | Birsan et al. |
| 6,023,722 A | 2/2000 | Colyer |
| 6,028,997 A | 2/2000 | Leymann et al. |
| 6,029,000 A | 2/2000 | Woolsey et al. |
| 6,044,217 A | 3/2000 | Brealey et al. ............. 395/701 |
| 6,067,548 A | 5/2000 | Cheng .................. 707/103 |
| 6,067,623 A | 5/2000 | Blakley, III et al. ......... 713/204 |
| 6,070,184 A | 5/2000 | Blount et al. |
| 6,085,030 A | 7/2000 | Whitehead et al. ..... 395/200.33 |
| 6,092,102 A | 7/2000 | Wagner |
| 6,119,149 A | 9/2000 | Notani .................. 709/205 |
| 6,141,686 A | 10/2000 | Jackowski et al. .......... 709/224 |
| 6,141,701 A | 10/2000 | Whitney |
| 6,148,336 A | 11/2000 | Thomas et al. |
| 6,189,044 B1 | 2/2001 | Thomson |
| 6,212,546 B1 | 4/2001 | Starkovich et al. |
| 6,222,533 B1 | 4/2001 | Notani et al. |
| 6,226,675 B1 | 5/2001 | Meltzer et al. ............. 709/223 |
| 6,230,287 B1 | 5/2001 | Pinard et al. .................. 714/31 |
| 6,243,737 B1 | 6/2001 | Flanagan et al. |
| 6,292,932 B1 | 9/2001 | Baisley et al. |
| 6,330,569 B1 | 12/2001 | Baisley et al. |
| 6,334,114 B1 | 12/2001 | Jacobs et al. |
| 6,336,122 B1 | 1/2002 | Lee et al. .................. 707/204 |
| 6,338,064 B1 | 1/2002 | Ault et al. .................. 707/9 |
| 6,343,265 B1 | 1/2002 | Glebov et al. |
| 6,345,283 B1 | 2/2002 | Anderson |
| 6,348,970 B1 | 2/2002 | Marx |
| 6,353,923 B1 | 3/2002 | Bogel et al. .................. 717/4 |
| 6,360,221 B1 | 3/2002 | Gough |
| 6,377,939 B1 * | 4/2002 | Young .................. 705/34 |
| 6,393,459 B1 | 5/2002 | Lurndahl .................. 709/203 |
| 6,408,311 B1 | 6/2002 | Baisley et al. |
| 6,411,698 B1 | 6/2002 | Bauer et al. |
| 6,445,711 B1 | 9/2002 | Scheel et al. |
| 6,463,503 B1 | 10/2002 | Jones et al. ................. 711/114 |
| 6,470,364 B1 | 10/2002 | Prinzing |
| 6,484,204 B1 | 11/2002 | Rabinovich ................ 709/226 |
| 6,490,610 B1 | 12/2002 | Rizvi et al. ................ 709/101 |
| 6,516,322 B1 | 2/2003 | Meredith |
| 6,549,949 B1 | 4/2003 | Bowman-Amuah ........ 709/236 |
| 6,560,769 B1 | 5/2003 | Moore et al. |
| 6,567,738 B2 | 5/2003 | Gopp et al. |
| 6,584,454 B1 | 6/2003 | Hummel et al. |
| 6,569,693 B2 | 7/2003 | Borwanker ................ 709/219 |
| 6,594,700 B1 | 7/2003 | Graham et al. |
| 6,601,113 B1 | 7/2003 | Koistinen et al. |
| 6,604,198 B1 | 8/2003 | Beckman et al. ............ 713/167 |
| 6,609,115 B1 | 8/2003 | Mehring et al. |
| 6,615,258 B1 | 9/2003 | Barry et al. |
| 6,636,491 B1 | 10/2003 | Kari et al. |
| 6,637,020 B1 | 10/2003 | Hammond |
| 6,643,652 B2 | 11/2003 | Helgeson et al. |
| 6,654,932 B1 | 11/2003 | Bahrs et al. |
| 6,678,518 B2 | 1/2004 | Eerola |
| 6,687,702 B2 | 2/2004 | Vaitheeswaran et al. |
| 6,687,848 B1 | 2/2004 | Najmi |
| 6,721,779 B1 | 4/2004 | Maffeis |
| 6,732,237 B1 | 5/2004 | Jacobs et al. |
| 6,748,420 B1 | 6/2004 | Quatrano et al. |
| 6,754,884 B1 | 6/2004 | Lucas et al. |
| 6,757,689 B2 | 6/2004 | Battas et al. |
| 6,789,054 B1 | 9/2004 | Makhlouf |
| 6,795,967 B1 | 9/2004 | Evans et al. .................. 719/310 |
| 6,802,000 B1 | 10/2004 | Greene et al. ............... 713/168 |
| 6,804,686 B1 | 10/2004 | Stone et al. |
| 6,823,495 B1 | 11/2004 | Vedula et al. |
| 6,832,238 B1 | 12/2004 | Sharma et al. |
| 6,847,981 B2 | 1/2005 | Song et al. |
| 6,850,893 B2 * | 2/2005 | Lipkin et al. .................. 705/8 |
| 6,850,979 B1 | 2/2005 | Saulpaugh et al. |
| 6,874,143 B1 | 3/2005 | Murray et al. |
| 6,889,244 B1 | 5/2005 | Gaither et al. |
| 6,915,519 B2 | 7/2005 | Williamson et al. |
| 6,918,084 B1 | 7/2005 | Slaughter et al. |
| 6,947,943 B2 * | 9/2005 | DeAnna et al. ............. 707/100 |
| 6,950,872 B2 * | 9/2005 | Todd, II .................. 709/227 |
| 6,959,307 B2 | 10/2005 | Apte |
| 6,963,914 B1 | 11/2005 | Breitbart et al. |
| 6,971,096 B1 | 11/2005 | Ankireddipally et al. |
| 6,976,086 B2 | 12/2005 | Sadeghi et al. |
| 6,983,421 B1 | 1/2006 | Lahti et al. |
| 7,007,088 B1 * | 2/2006 | Najmi .................. 709/225 |
| 7,017,146 B2 | 3/2006 | Dellarocas et al. |
| 7,043,722 B2 | 5/2006 | Bau, II |
| 7,051,072 B2 | 5/2006 | Stewart et al. |
| 7,051,316 B2 | 5/2006 | Charisius et al. |
| 7,054,858 B2 | 5/2006 | Sutherland |
| 7,062,718 B2 | 6/2006 | Kodosky et al. |
| 7,069,507 B1 | 6/2006 | Alcazar et al. |
| 7,072,934 B2 | 7/2006 | Helgeson et al. |
| 7,076,772 B2 | 7/2006 | Zatloukal |
| 7,096,422 B2 | 8/2006 | Rothschiller et al. |
| 7,107,578 B1 | 9/2006 | Alpern |
| 7,111,243 B1 | 9/2006 | Ballard et al. |
| 7,117,504 B2 | 10/2006 | Smith et al. |
| 7,127,704 B2 | 10/2006 | Van De Vanter et al. |
| 7,143,186 B2 | 11/2006 | Stewart et al. |
| 7,184,967 B1 | 2/2007 | Mital et al. |
| 7,240,331 B2 | 7/2007 | Vion-Dury et al. |
| 2001/0032263 A1 | 10/2001 | Gopal et al. |
| 2002/0004848 A1 * | 1/2002 | Sudarshan et al. .......... 709/310 |
| 2002/0010781 A1 | 1/2002 | Tuatini |
| 2002/0010803 A1 * | 1/2002 | Oberstein et al. ........... 709/318 |
| 2002/0016759 A1 | 2/2002 | Marcready et al. |
| 2002/0035604 A1 | 3/2002 | Cohen et al. |
| 2002/0038450 A1 * | 3/2002 | Kloppmann et al. ........ 717/102 |
| 2002/0049788 A1 | 4/2002 | Lipkin et al. |
| 2002/0073080 A1 | 6/2002 | Lipkin |
| 2002/0073396 A1 | 6/2002 | Crupi et al. |
| 2002/0078365 A1 | 6/2002 | Burnette et al. |
| 2002/0083075 A1 * | 6/2002 | Brummel et al. ............ 707/102 |
| 2002/0111922 A1 * | 8/2002 | Young et al. .................. 705/80 |
| 2002/0120685 A1 | 8/2002 | Srivastava et al. |
| 2002/0143960 A1 | 10/2002 | Goren et al. |
| 2002/0152106 A1 | 10/2002 | Stoxen et al. |
| 2002/0161826 A1 | 10/2002 | Arteaga et al. |
| 2002/0165936 A1 | 11/2002 | Alston et al. |
| 2002/0174178 A1 | 11/2002 | Stawikowski |
| 2002/0174241 A1 | 11/2002 | Beged-Dov et al. |
| 2002/0184145 A1 | 12/2002 | Sijacic et al. |
| 2002/0184610 A1 * | 12/2002 | Chong et al. ................ 717/109 |
| 2002/0194244 A1 * | 12/2002 | Raventos .................. 709/101 |
| 2002/0194267 A1 | 12/2002 | Flesner et al. |
| 2002/0194495 A1 | 12/2002 | Gladstone et al. |
| 2003/0004746 A1 | 1/2003 | Kheirolomoom et al. |
| 2003/0005181 A1 | 1/2003 | Bau III, et al. |
| 2003/0014439 A1 | 1/2003 | Boughannam |
| 2003/0018661 A1 | 1/2003 | Darugar |
| 2003/0018665 A1 | 1/2003 | Dovin et al. |
| 2003/0018832 A1 | 1/2003 | Amierisetty et al. |
| 2003/0028579 A1 | 2/2003 | Kulkami et al. |
| 2003/0037181 A1 * | 2/2003 | Freed .................. 709/328 |
| 2003/0041198 A1 | 2/2003 | Exton et al. |
| 2003/0043191 A1 | 3/2003 | Tinsley et al. |
| 2003/0046266 A1 | 3/2003 | Mullins et al. |

| | | |
|---|---|---|
| 2003/0046591 A1 | 3/2003 | Asghari-Kamrani et al. |
| 2003/0051066 A1 | 3/2003 | Pace et al. |
| 2003/0055868 A1 | 3/2003 | Fletcher et al. |
| 2003/0055878 A1 | 3/2003 | Fletcher et al. |
| 2003/0074217 A1 | 4/2003 | Beisiegel et al. |
| 2003/0074467 A1 | 4/2003 | Oblak et al. |
| 2003/0079029 A1 | 4/2003 | Garimella et al. |
| 2003/0084203 A1 | 5/2003 | Yoshida et al. |
| 2003/0097345 A1 | 5/2003 | Upton |
| 2003/0110117 A1 | 6/2003 | Saidenbereg et al. |
| 2003/0110446 A1 | 6/2003 | Nemer |
| 2003/0126136 A1 | 7/2003 | Omoigui |
| 2003/0149791 A1 | 8/2003 | Kane et al. |
| 2003/0167358 A1 | 9/2003 | Marvin et al. |
| 2003/0196168 A1 | 10/2003 | Hu |
| 2003/0233631 A1 | 12/2003 | Curry |
| 2004/0019645 A1 | 1/2004 | Goodman et al. |
| 2004/0040011 A1 | 2/2004 | Bosworth et al. |
| 2004/0068568 A1 | 4/2004 | Griffin |
| 2004/0078373 A1* | 4/2004 | Ghoneimy et al. ............ 707/10 |
| 2004/0133660 A1 | 7/2004 | Junghuber et al. |
| 2004/0148336 A1 | 7/2004 | Hubbard et al. |
| 2004/0204976 A1* | 10/2004 | Oyama et al. .................. 705/7 |
| 2004/0216086 A1 | 10/2004 | Bau |
| 2004/0225995 A1 | 11/2004 | Marvin et al. |
| 2004/0260715 A1 | 12/2004 | Mongeon et al. |
| 2005/0050068 A1 | 3/2005 | Vachillo et al. |
| 2005/0278585 A1 | 12/2005 | Spencer |
| 2006/0206856 A1 | 9/2006 | Breeden et al. |
| 2006/0234678 A1 | 10/2006 | Juitt et al. |
| 2007/0038500 A1 | 2/2007 | Hammitt et al. |

OTHER PUBLICATIONS

Kunisetty "Workflow Modeling and simulation Using an Extensible Object-Oriented Knowledge Base Management System" Citeseer, 1996, pp. 1-60.

Van Der Aalst et al., Verification of XRL: An XML-Based Workflow Language, IEEE, Jul. 2001, pas. 427-432.

Paul, Laura Gibbone, "RosettaNet: Teaching business to work together", Oct. 1, 1999. http://www.developer.com/xml/article.php/616641.

"Introducing Microsoft DotNet"; by ChristopheLauer, Jul. 2, 2002; http://web.archive.org/web/20020702162429/http://www.freevbcode.com/ShowCode.asp?ID=2171; pp. 1-10.

C. Moran et al. *"ARIES: A Transaction Recovery Method Supporting Fine-Granularity Locking and Partial Rollbacks Using Write-Ahead Logging"*, ACM Transaction on Database Systems, vol. 17, No. 1, Mar. 1992, pp. 94-162.

JAVA™ Debug Interface, definitions, retrieved from <URL http://java.sun.com/j2se/1.4.2/docs/guide/jpda/jdi/overview-summary.html, Feb. 21, 2007.

Embury et al., "Assisting the Comprehension of Legacy Transaction", Reverse Engineering, 2001, Proceedings, Eighth Working Conference on Oct. 2-5, 2001, pp. 345-354.

Mays et al., "A Persistent Store for Large Shared Knowledge Bases", Knowledge and Data Engineering, IEEE Transactions on vol. 3, Issue 1, Mar. 1991, pp. 33-41.

Tang et al., "Integrating Remote Invocation and Distributed Shared State", Parallel and Distributed Processing Symposium, 2004, Proceedings, 18th International, Apr. 26-30, 2004, (10 pages).

Kilgore, "Multi-Language, Open-Source Modeling Using the Microsoft Architecture", Simulation Conference, 2002, Proceedings of the Winter, Dec. 8-11, 2002, vol. 1, pp. 629-633.

Sosnoski, "XML and Java Technologies: Data Binding, Part 1: Code Generation Approaches—JAXB and more", IBM, pp. 1-11, 2003.

Erich Liebmann et al., "Adaptive Data Dissemination and Caching for Edge Service Architectures Built with the J2EE", Mar. 2004, ACM Press, 2004 ACM Symposium on Applied Computing, pp. 1717-1724.

Chen et al., "eCo Architecture for Electronic Commerce Interoperability", Jun. 29, 1999, CommerceNet, pp. 1-107.

Bogunovic, "A Programming Model for Composing Data Flow Collaborative Applications", Proceedings of the IEEE International Conference on Engineering of Computer Based Systems, Mar. 7-12, 1999, pp. 106-112.

Sung et al. , "A Multimedia Authoring Tool for the Internet", IEEE Transactions on Consumer Electronics, 1997 pp. 304-308.

Smith, et al. "Marching Towards a Software Reuse Future", ACM Ada Letters, Nov./Dec. 1994, pp. 62-72 vol. 14, No. 6.

Stylus Studio, "Xquery Mapper", 2007, 6 pages, Stylus Studios.

Altova, "XML-to-XML Mapping", 2007, 3 pages, Altova Map Force.

Jamper, "Jamper-Java XML Mapper", 2007, 4 pages, Sourceforge.

Van Der Aalst et al., "Verification of XRL: and XML-based Workflow Language", IEEE, Jul. 2001, The Sixth International Conference on Computer Supported Cooperative Work in Design, pp. 427-432.

Alonso et al., "Advanced Transaction Models in Workflow Contexts", IEEE, Feb. 1996, Proceedings of 12th International Conference on Data Engineering, retrieved from: http://citeseer.ist.psu.edualonso96advanced.html., pp. 574-581.

Plaindoux, "XML transducers in Java", May 2002, The Eleventh International World Wide Conference, retrieved from: http://www2002.org/CDROM/poster/132/index.html., 6 pages.

HP, "HP Application Server Developer's Guide," Version 8.0, Hewlett-Packard Company, 1999-2001. pp. 27-81, 127-160, 195-271.

* cited by examiner

COLLABORATIVE BUSINESS PLUG-IN FRAMEWORK

CLAIM OF PRIORITY

This application claims priority to U.S. Provisional Patent Application No. 60/376,906, filed May 1, 2002, entitled "COLLABORATIVE BUSINESS PLUG-IN FRAMEWORK," which is hereby incorporated herein by reference.

CROSS REFERENCE TO RELATED PATENT DOCUMENTS

The following co-pending U.S. patent documents are assigned to BEA Systems, Inc., the assignee of the present application, and these documents are hereby incorporated herein by reference:

(A) U.S. patent application Ser. No. 10,404,684 (now U.S. Pat. No. 7,424,717, to Mike Blevins et al. and entitled, "SYSTEMS AND METHODS FOR BUSINESS PROCESS PLUG-IN DEVELOPMENT"; and (B) U.S. patent application Ser. No. 10,404,296, to Mike Blevins et al. and entitled, "SYSTEM AND METHOD FOR COLLABORATIVE BUSINESS PLUG-INS".

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The invention relates to adding functionality to existing applications.

BACKGROUND

In an e-business world, businesses must perform effectively at a rapid pace. To achieve this level of performance, many companies automate their business processes by using a business process management system: a system that defines, manages, and executes business processes using software. The order in which business activities are executed in the process is driven by a computer representation of the process called a workflow.

A workflow automates a business process by controlling the sequence of activities in the process, and by invoking the appropriate resources required by the various activities in the process. These resources might be software components that perform a required activity, or they might be people who respond to messages generated by the business process.

To achieve this level of workflow automation, a workflow management system provides support in three broad areas. The first area involves workflow definition and execution, or capturing the definition of the workflow, managing the execution of workflow processes in an operational environment, and sequencing the various activities to be performed. The second area involves data administration, or managing the people involved in a workflow, rerouting tasks when needed, and maintaining business calendars that govern the schedule of workflow activities. The third area involves workflow monitoring, or tracking the status of workflow processes, and dynamically configuring the workflow at run time.

An integration system can support all three areas of workflow management. An automated business process will not, however, entirely replace people with computers. People still wish to be involved in these otherwise automated processes, either by making discretionary decisions or by handling exceptions or problems as they arise.

BRIEF SUMMARY

Systems and methods in accordance with embodiments of the present invention can utilize a business process management (BPM) framework, such as a plug-in framework, for integrating business processes. A plug-in manager, which can be part of an integration process engine, can support the management of plug-ins in such a framework. A plug-in manager can support the configuration, design, and run-time management of plug-ins.

A plug-in application programming interface (API) can be used to support the design and development of plug-ins. A plug-in API can provide support for configuration, design, and run-time interactions between the process engine and a deployed plug-in. The plug-in API can consist of components such as session beans, run-time management classes, and packages. An integration data store can be used to store plug-in configuration information.

A server, or cluster of servers, can be used to manage plug-in deployment, and can include a security realm service for supporting security interfaces. A server can include an event queue for receiving event messages, as well as an event processor for managing events received by the event queue. Embodiments in accordance with the present invention can also provide a method for developing plug-ins that can be used with such a framework. In such a method, a session bean can be created to define plug-in classes and interfaces. This session bean then be packaged, such as by creating a build directory and compiling source files into the directory in order to package the plug-in in a JAR file. Once the session bean is packaged, it can be deployed on a server used by the plug-in framework.

A session bean can be defined by implementing session bean interface methods. Home and remote interfaces can be used to allow a client to access the session bean, and a run-time component class can be created to define run-time execution characteristics. A user can implement and register an event handler to process incoming plug-in events, and can implement a plug-in data interface in order to enable the reading and parsing of plug-in data.

A session bean can also be deployed as part of an integration application by editing a configuration file for the application. A plug-in home interface can be defined to allow a process engine to detect the plug-in. A user can also implement classes necessary for each component related to the plug-in, in order to define the functionality for that component.

Other features, aspects and objects of the invention can be obtained from a review of the specification, the figures, and the claims.

DETAILED DESCRIPTION

Systems and methods in accordance with embodiments of the present invention can overcome deficiencies in existing business process management (BPM) and integration systems by utilizing a BPM framework. An exemplary BPM framework can be used to design, execute, and monitor business processes, as well as to administer related data with an integration system. Components of such a framework, which can be provided by an integration system for example, can include component such as a process engine or BPM server, an integration studio or design client, and a worklist or run-time management client.

Figure 1:
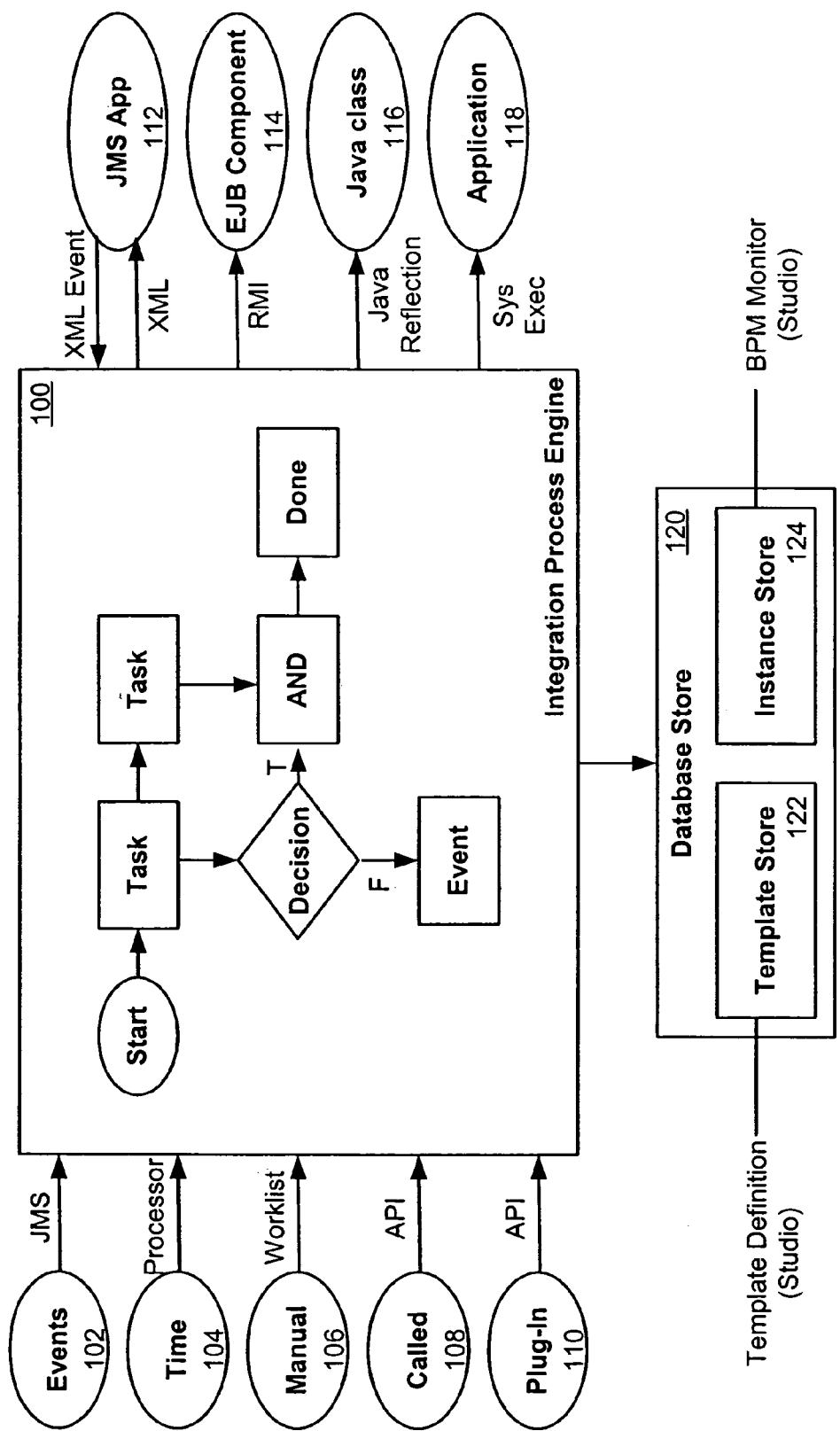
FIG. 1 is a diagram of a business processing model that can be used in accordance with one embodiment of the present invention.

In addition to these design and run-time management clients, a user can create custom clients to manage business processes, and/or enhance an existing set of user interface features using a BPM API. A BPM API can be used to create custom configuration, design, run-time management, and monitoring clients. FIG. 1 illustrates an exemplary BPM processing model in accordance with one embodiment of the present invention.

Such a BPM processing model can depend on the integration process engine 100, which serves as the controller for run-time instances, managing the execution and monitoring the progress of those instances. Certain methods can allow a user to start, or instantiate, a business process and interact with an existing business process. Such methods can include methods called: in response to an XML event 102, as a time-based event 104, through a manual call 106, through a call from another business process 108, or through a plug-in interface 110.

Certain entities can be integrated into a business process, such as a JMS application 112, EJB component 114, Java class 116, or another application 118. The database store 120 stores templates, template definitions, and run-time instances, such as in a template store 122 or instance store 124. A user can create templates and template definitions, and can monitor run-time instances using a studio or custom design client.

An integration process engine can run on a platform, such as WebLogic Server from BEA Systems of San Jose, Calif., and can take advantage of services such as J2EE-compliant services. One such service that can be used by BPM is an Enterprise JavaBean (EJB). An EJB can provide lifecycle management and services such as caching, persistence, and transaction management. The process engine can consist of a combination of session and entity EJBs. In addition, message-driven beans can be used for providing asynchronous messaging services.

A security realm service can support security interfaces including principals, groups, access control lists (ACLs), and permissions. A process engine can build on any underlying server security realm. Roles defined in an integration studio can map to server security groups, and users can map to server users. A web server service can support web browsers and other custom design and run-time management clients that use HTTP, servlets, and JSPs. Java Naming and Directory Service (JNDI) can be used to support directory service functionality. Java Database Connectivity (JDBC) can be used to support Java database connectivity and persistence. The process engine can use JDBC for persisting data.

Another J2EE service that can be utilized is a messaging service, such as the Java Message Service (JMS), which includes the ability to transmit XML content. The process engine can use JMS for communicating worklist, time, and event notifications, and error and audit messages. A clustering service can also be used, which supports scalability and high-availability by grouping multiple servers together in a way that is transparent to application developers and end users. The process engine can take advantage of clustering. To ensure data integrity and idempotence, a user can specify a unique transaction ID. A time services J2EE service can also be used, which builds on services provided by an underlying server to support timed events and other timer-based activities.

Process Engine Component Architecture

Figure 2:
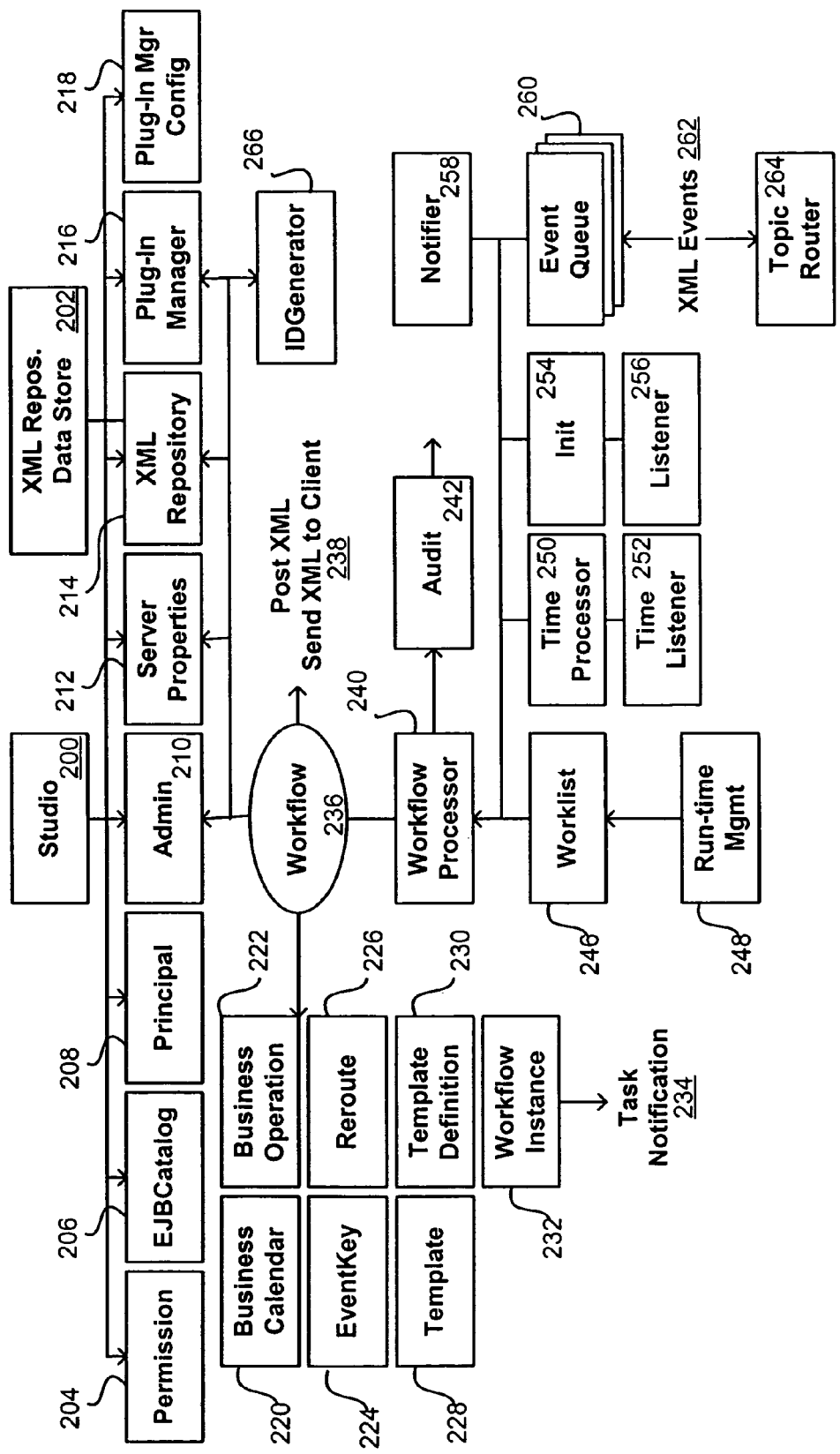
FIG. 2 is a diagram of an architecture of the process engine of FIG. 1.

An exemplary integration process engine in accordance with one embodiment of the present invention consists of the following components: twelve session EJBs, eleven entity EJBs, two startup classes (TimeProcessor 250 and Init 254), and four message-driven beans (EventQueue 260, InitListener 256, TimeListener 252, and Topic Router 264), although many bean/class combinations are possible. An architecture for such a process engine, including client and JMS interactions, is illustrated in FIG. 2. In this embodiment, the process engine manages the design, administration, and execution of a business process. The Admin 210 and Worklist 246 session EJBs are the primary interfaces for design and run-time management clients, respectively.

A Workflow Processor 240 session EJB provides one main interface to the process engine. Workflow 236 from the process engine can be directed to the workflow processor. Workflow can also be directed to EJBs such as an Admin 210 EJB, or can be posted as XML or sent as XML to a client 238. This interface is not part of the BPM API in at least one embodiment. An Audit 242 session EJB can manage the audit, trace, and error 244 messages, while an Event Queue 260 message-driven bean can manage XML events 262. A Topic Router 264 message-driven bean can be supported for backward compatibility. It can reroute all messages sent to an Event JMS topic, which may not be supported by the process engine, to the Event Queue 260 message-driven bean.

A Time Processor 250 startup class and a Time Listener 252 message-driven bean can manage timed events. An initialize or "Init" 254 startup class and Init Listener 256 message-driven bean can initialize the process engine. A number of Entity EJBs (such as for example Business Operation 222, EventKey 224, Template 228, and Template Definition 230) can maintain two implementations for performance purposes: a read-write implementation used during configuration and design, and a read-only implementation used during run time.

Session EJBs can provide application services to clients upon request. BPM session EJBs can provide the primary interface to the process engine. Many functions of the BPM session EJBs are accessible to client applications via the BPM API. An Admin 210 session EJB, such as may be implemented as stateful session bean server.admin.Admin, can provide the primary interface for design clients, including clients using an integration studio 200 as well as custom design clients. An Audit 242 session EJB, such as server.audit.Audit, can be a stateless EJB that sends audit and error output to JMS. A Catalog 206 session EJB, such as server.catalog.E-JBCatalog, can be a stateful session bean that catalogs EJBs deployed on the server.

An ID Generator 266 session EJB, such as server.idgenerator.IDGenerator, can be a stateless session EJB that generates unique Ids for various system object classes. A Notifier 258 session EJB, such as server.notify.Notifier, can be a stateless EJB that supports JMS queue and publishing services. A Permission 204 session EJB, such as server.permission.Permission, can be a stateless session EJB that supports getting and setting user and role permissions.

A Plug-In Manager 216 session EJB, such as server.plugin.PluginManager, can be a stateless session EJB that provides run-time management of plug-ins during workflow execution. Run-time management 248 can be used with a worklist 246, for example. A Plug-In Manager Configuration 218 session EJB, such as server.plugin.PluginManagerCfg, can be a stateless session EJB that provides configuration- and design-time support and management of plug-ins. A Server Properties EJB 212, such as server.serverproperties.ServerProperties, can be a stateless session bean that supplies the BPM server properties. A principal 208 EJB, such as server.principal.Principal, can be a stateless session bean that links the process engine to the server security realms.

A Workflow Processor 240 EJB, such as server.workflowprocessor.WorkflowProcessor, can be a stateful session bean that provides the main interface to the process engine. A Worklist 246 EJB, such as server.worklist.Worklist, can be a stateful session bean that provides the primary interface for run-time management clients, including Worklist and custom run-time management clients. An XML repository 214 EJB, such as repository.ejb.XMLRepository, can be a stateless EJB that provides access to the XML repository data store 202.

Stateful session EJBs can be available to a client for the duration of a session, until the client releases the resource. Stateless session EJBs, on the other hand, can be a shared commodity. Multiple clients can access a particular EJB. There is no guarantee that the process engine will use the same EJB to handle multiple method calls to the EJB. Stateless session EJBs can facilitate clustering, as subsequent method calls can be handled by different instances of an EJB on one or more servers.

Entity EJBs represent data objects and include state information. BPM entity EJBs may not be accessible directly through the BPM API. A Common package can provide classes for obtaining state information. BPM entity EJBs can include Business Calendar 220 EJBs for defining business-oriented time calculations, Business Operation 222 EJBs for defining user-defined EJB or Java classes, and Event Key 224 EJBs for defining event key expressions for filtering events. Two implementations of an EventKey EJB can be maintained for performances purposes: a read-write implementation used during configuration and design, and a read-only implementation used during run time.

A Reroute 226 entity EJB can define task rerouting for users at predetermined time intervals, while a Template entity EJB can provide a design-time representation of a workflow template. A Template 228 EJB can be used at run time to create a running instance. Two implementations of a Template EJB can be maintained for performances purposes: a read-write implementation used during configuration and design, and a read-only implementation used during run time.

A Template Definition 230 entity EJB can provide a design-time representation of a workflow template definition, and can be used at run time to create a running instance. Two implementations of this EJB can be maintained for performances purposes: a read-write implementation used during configuration and design, and a read-only implementation used during run time. A Workflow Instance 232 EJB can provide a run-time representation of a workflow instance, and can be used to generate a task notification 234, for example.

A system can also utilize BPM startup classes, such as a Time Processor 250 class which manages timed events. This class can be used with a Time Listener 252 message-driven bean. An Init 254 class can be used to initialize the BPM framework, and can be used with the Init Listener 256 message-driven bean.

A system can also utilize message-driven beans, such as an Event Queue 260 that acts as a JMS destination for event messages, as well as an Init Listener 256 bean that initializes the BPM framework. A Time Listener 252 bean can manage timed events, and can be used with a Time Processor 250 startup class. A Topic Router 264 bean can be used for backward compatibility, such as with previous versions of a process engine. A Topic Router 264 bean can reroute all messages sent to an Event JMS topic to the Event Queue 260 message-driven bean, which handles messages for the newly-supported Event Queue queue.

BPM API

A BPM API can provide support for configuration, design, and run-time interactions between the process engine and a deployed plug-in. A plug-in API can consist of two session EJBs, a set of run-time management classes and a package. One component of a BPM Plug-In API is a Plug-In Manager, or a stateless session EJB providing run-time management of plug-ins during workflow execution. The Plug-In Manager can provide meta-data about the deployed plug-ins, enable access to plug-in design and run-time components, and handle event notifications to and from plug-ins.

A Plug-In Manager Configuration EJB can also be used, which is a stateless session EJB providing configuration and design management of plug-ins. This EJB can maintain plug-in configuration information, manage the plug-in framework cluster-wide state transitions, and maintain a list of plug-ins that are registered for the system event notifications. Plug-In classes can also be used to provide run-time management of plug-ins during workflow execution. A common plug-in package can provide client and process engine functions, including value object classes. All members of this package can be serializable to allow for exchanges between the client and process engine. One embodiment of a BPM API consists of nine session beans, as described above, as well as seven packages including a client common package, a client utility package, a common package, a common plug-in package, a common security package, a utility package, and a repository helper package. The IDGenerator, Notifier, and WorkflowProcessor EJBs may not be included in the BPM API.

An Admin session EJB is a stateful EJB that serves as the primary interface for design clients, including studio and custom design clients. Using public methods provided by an Admin EJB, a user can define templates, template definitions, and associated business operations. A user can also create business calendars and event keys, and reroute tasks. A user can control the stages in the lifecycle of a task, and can get class descriptors, tasks, variables, instances, and statistics reports. A user can also import and export template definitions and complete workflow packages.

An Audit Session EJB can be a stateless EJB that encapsulates a JMS topic to which the process engine sends audit and error messages on behalf of clients. The Audit EJB can also encapsulate access to an Error topic, to which error messages are sent. Users can define audit entries via task actions when designing workflow template definitions. Each audit message can consist of an XML document that conforms to the format defined in the Audit DTD. Audit information (Info) and error (Error) messages can be sent to a server log file.

An EJB Catalog Session EJB can be a stateful EJB that classifies the EJBs deployed on a particular server. The EJB-Catalog session EJB scans the JNDI tree, collects the EJB metadata, and stores it in a catalog. Design clients can use the EJBCatalog to define business operations. Using the public methods provided by an EJBCatalog EJB, a user can list the JNDI names of all EJBs deployed on the server, and can list the EJB metadata describing the internals of all EJBs installed on the server. A user can set the root context in the WebLogic JNDI tree in which cataloging is to begin, and can specify whether the catalog should be regenerated with each listing request.

A Permission Session EJB can be a stateless EJB that enables a user to get and set security permissions pertaining to both role and user actions. A Plug-in Manager Session EJB can be a stateless EJB that provides run-time management of plug-ins during workflow execution. A Plugin Manager Cfg Session EJB can be a stateless EJB that enables a user to manage the implementation of user-defined plug-ins.

A Server Properties Session EJB can be a stateless EJB that enables clients to obtain information about the properties governing BPM. Using the public methods provided by a Server Properties EJB, a user can get information such as software version, including the major and minor version numbers, build number, and product name. A user can also get relevant software properties, as well as the software version required to support the features defined in a template.

Principal Session EJB can be a stateless EJB that enables clients to interface with a server security realm and access BPM organizations, roles, users, and other security properties. Using public methods provided by a Principal EJB, a user can configure, manage, and obtain information about the organizations, roles, and users that ensure secure access to the system. A Worklist session EJB can be a stateful EJB serving as the primary interface for run-time management clients, including Worklist and custom run-time management clients. The Worklist EJB can enable interaction with running instances. Using the public methods provided by the Worklist EJB, a user can get startable business processes, instantiate business processes, and get tasks and task counts. A user can also control the stages in the lifecycle of a task being executed, respond to notifications, set task properties, and invoke exception-handling methods.

An XML Repository Session EJB can be a stateless EJB that provides access to the XML repository database. Using the public methods provided by the XML Repository EJB, a user can manage XML repository folders, manage XML repository entities, and get EJB environment variable values.

A Client Common Package can provide common client-side classes used by a BPM client. This package can include classes for connecting to the process engine, facilitating client GUI layout and development and generating dialog boxes, getting exception, task, and versioning information, and managing resources. Classes can also be included for caching images and icons, filtering files by file extension, and generating a unique transaction ID for use in a clustered environment. A Client Utility Package can provide two JMS utilities, such as JMSTest and JMSTestAddr, for testing the publish and subscribe features of a JMS topic.

A Client/Server Common Package can provide classes used by both the BPM client and the integration process engine. The package can include Value objects for describing organizations, users, and roles. The package can also include templates and template definitions, tasks and task reroutings, variables, running instances and functions, business calendars, Java classes, event keys, and versioning information. The package can also include descriptors for Java classes, EJBs, EJB invocations, and server-side Java class methods. The package can have a mechanism for serializing long strings, or strings that exceed 64 KB when they are UTF-8 encoded, in pre-JDK 1.3 run-time environments. The package can have a message interface for language-independent server messaging. Package members can be serialized to facilitate the exchange of information between the client and the server.

A Plug-In Common Package can provide common classes used to manage user-defined plug-ins. A Security Common Package can provide common classes used to define security permissions. The package can include value objects for describing role and user permissions, as well as security permission types. A Utility Package can provide general BPM utilities, including a utility for generating message-driven beans. An XML Repository Helper Package can provide common classes used to access the XML repository. The package can include Value objects for describing the XML repository folder and entities, methods for creating and managing folders and subfolders, and methods for creating and managing entities.

BPM Application Development Tasks

A BPM API can enable users to accomplish many application development tasks. For example, a BPM API, via a studio client or a custom configuration client, can enable users to configure security realms (organizations, roles, and users), business operations, event keys, and business calendars. A BPM API can also enable users to perform design tasks, such as creating and managing workflow templates and template definitions. Users can also create and manage tasks and task reroutings, manage the XML repository database, and import and export design data.

A BPM API, via a Worklist or a custom run-time management client, can enable users to perform the run-time management tasks such as managing the active organization and starting business process instances. The API can also allow users to get, assign, and execute tasks, as well as to respond to client requests. The user can mark tasks as done or undone, set task properties, update variables, and invoke exception handlers.

A BPM API can also enable users to perform monitoring tasks, such as allowing a user to manage run-time instances, manage run-time variables, generate graphical reports based on workflow, tasks, user or role, and task status, and generate statistical reports based on workflow, task, user or role, and date.

Starting a Transaction

At least three actions can trigger an integration process engine to begin or resume its execution of a workflow. These actions can also mark the start of a new transaction. Such actions can include, for example, an API method call, an XML event, and a time-based event.

Whether an API method call also starts a new transaction can depend upon whether the calling application currently has a transaction context. If an external transaction context currently exists, an integration EJB can use that context. If the context does not exist, the EJB container can automatically create a new transaction in which to execute the call. Most EJB methods in the public API can use container-managed transactions.

When first instantiating a workflow, an integration system can execute the created actions for all tasks in the workflow. It can then process a Start node. In the case of an event- or time-triggered workflow, the system can activate the Start node corresponding to the event. In the case of a manually started or called workflow or subworkflow, the system can activate all manual or called start nodes, respectively. The progress of the transaction after the initial instantiation can depend on how the template definition is defined. Activation events propagate outward along the paths emanating from the point of origin, according to the built-in processing rules for each node type.

When processing a workflow, a process engine can return control to the system once there are no more actions to execute synchronously, or when the workflow instance enters a "quiescent" state, in which it waits for the next request. The workflow instance can enter a quiescent state when all Task nodes are waiting to be activated, executed, or are marked done. The workflow can also enter a quiescent state when all Event nodes are waiting to be activated, or have already been triggered; when all Decision and Join nodes are waiting for the final input to activate them, or they have already been activated; when all Start nodes either are waiting to be activated or have already been executed; and when all Done nodes are waiting to be activated.

A quiescent state can also mark the end of a transaction, and result in the transaction being committed, if and only if a new transaction was started at the point that the process engine was last triggered. If an external transaction context was exported before the API call trigger, then the external transaction can remain in effect, and control can be returned to the calling application.

When an action instantiates a subworkflow, all work performed by the subworkflow up to the point at which it enters a quiescent state can occur within the same transaction as the calling workflow. This work can include execution of actions in all called Start nodes, activation of all successor nodes associated with each Start node, and the actions associated with each successor. This processing can propagate through the subworkflow, resulting in either completion or quiescence, according to the rules previously described. If the subworkflow runs to completion, or does not quiesce, the Completed actions in the parent workflow can also be performed within the same transaction. If the Completed actions include an action to mark a task as complete, processing can continue, the MarkedDone actions can be performed, and successor nodes can be activated.

BPM Plug-ins

A framework can be utilized that supports the development of plug-ins. Plug-ins can be Java classes that extend the business process management functionality of an integration system. Developers can use a plug-in framework to integrate other products and technologies into the integration environment. Developers can also use plug-ins to modify the default design-time or run-time behavior of workflow components that are available, such as through an integration studio. These components can include, for example, Start, Event, and Done nodes, task actions, properties of workflow templates and template definitions, functions, message types, and variable types.

Certain plug-ins can be used with an integration system to enable integration specialists to integrate specific areas of integration functionality with business processes. One such plug-in is an application integration plug-in. This plug-in can provide access from a studio to application views. Application views can define access to enterprise systems and data. Integration specialists can define actions in workflow nodes that invoke application views to access enterprise systems and data.

A B2B integration plug-in can also be used, which can provide workflow actions and extends workflow node properties in a studio so they can be used in a B2B integration environment. Integration specialists can use those actions and extended node properties to create public workflows that implement each role in a conversation.

A data integration plug-in can be used to provide workflow actions in an integration studio for translating between binary data and XML, as well as a binary variable type to hold binary data during translation. Integration specialists can specify those actions in workflow nodes to perform data translation.

A plug-in can consist of a set of run-time loadable Java classes that extends the business process management (BPM) features and functionality of WebLogic Integration. Using plug-ins, the design or run-time behavior of BPM workflow components can be modified, including workflow components such as Start, Event, and Done nodes; task actions; properties of workflow templates and template definitions; functions; message types; and variable types.

For example, a user may want to trigger the execution of a business process by sending an e-mail message or other non-XML event, rather than by using a start node trigger method, for example. This can be accomplished by designing a plug-in that extends the behavior of the Start node to include support for this new nonXML trigger.

A Start Properties dialog box, for example, can list the Start Order event as a potential trigger on the Event pull-down menu, and displays the event information defined by the plug-in in the center of the dialog box when the event is selected. This behavior shows how the design of the Start node has been customized. At run-time, the Start Order event may trigger the workflow to start. This functionality shows how the run-time behavior of the Start node has been customized.

In addition to a standard framework for designing, executing, and monitoring business processes, an integration system can support a plug-in framework for BPM functionality, enabling a user to create plug-ins that customize existing software, and achieve powerful and seamless integration with other products and technologies.

Figure 3:
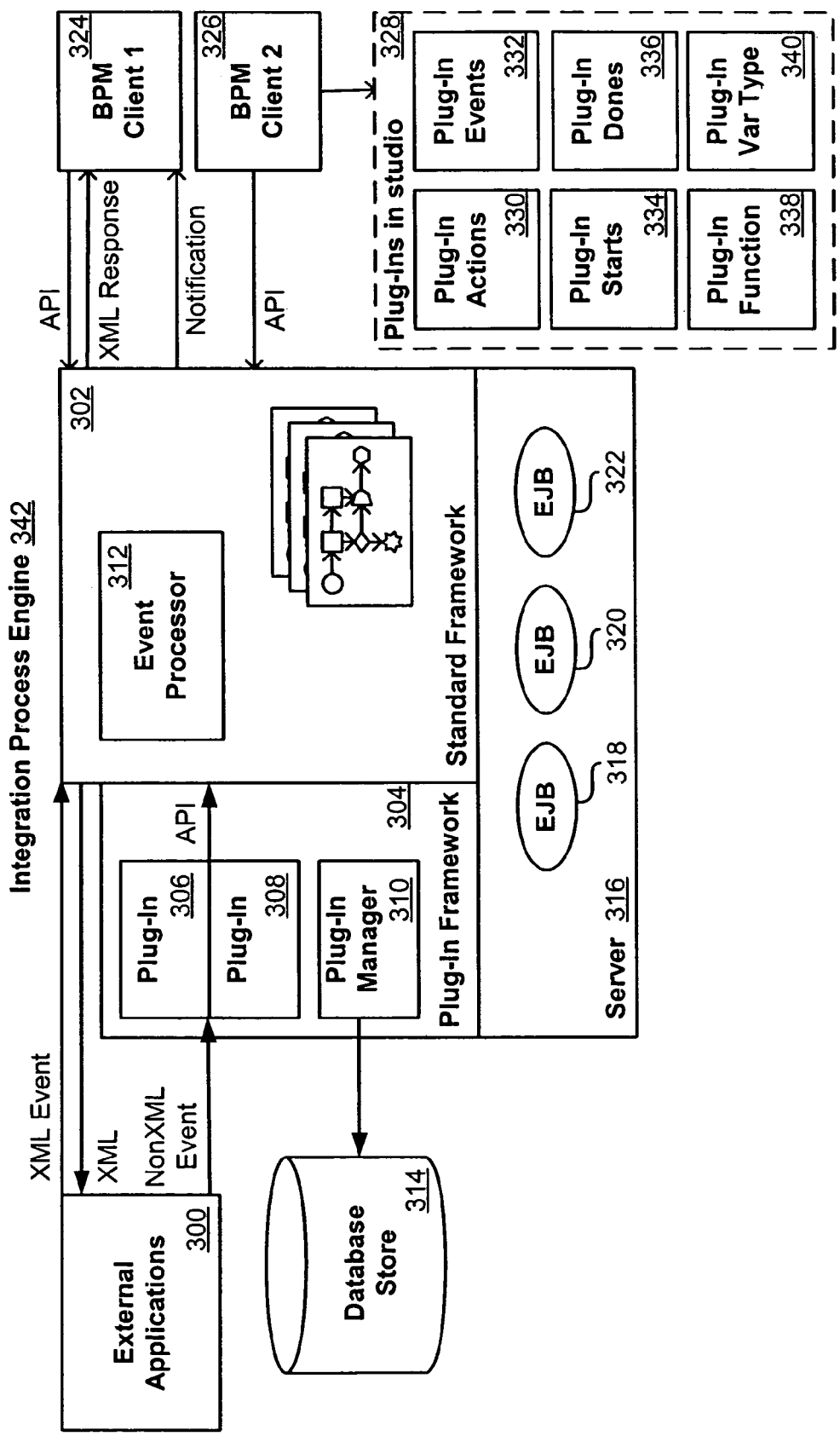
FIG. 3 is a diagram of a plug-in framework that can be used with the processing model of FIG. 1.

FIG. 3 illustrates an exemplary BPM plug-in framework 304 that can be used within an the overall BPM architecture. A server 316, which can include EJBs 318, 320, 322, can manage the deployment of the BPM and plug-in EJBs 306, 308. To make a plug-in available to BPM users, the user can simply deploy the plug-in as a session EJB on the server. The plug-in can be deployed as part of the integration application, such as by editing the config.xml file. A BPM plug-in manager 310 can store plug-in configuration information in an integration database store 314. An external application 300 can interact with the process engine via an XML event or nonXML event. NonXML events can be supported via the plug-in framework 304. An event processor 312, which can be part of a standard framework 302, can manage both XML and non-XML events.

The main components of a plug-in framework 304 can include a plug-in manager 310, which supports the management of plug-ins 306, 308 and a plug-in API, which supports the design and development of plug-ins. The plug-in manager 310 can be a dedicated part of an integration process engine 342 that supports the configuration, design, and run-time management of plug-ins. The plug-in manager 310 can oversee the loaded plug-ins and their interactions with the integration process engine and BPM clients 324, 326, and can route all plug-in related requests. Requests can be routed to plug-ins in the studio 328. The studio 328 can contain plug-ins to handle, for example, plug-in functions 330, plug-in events 332, plug-in starts 334, plug-in dones 336, plug-in functions 338, and plug-in variable types 340.

Figure 4:
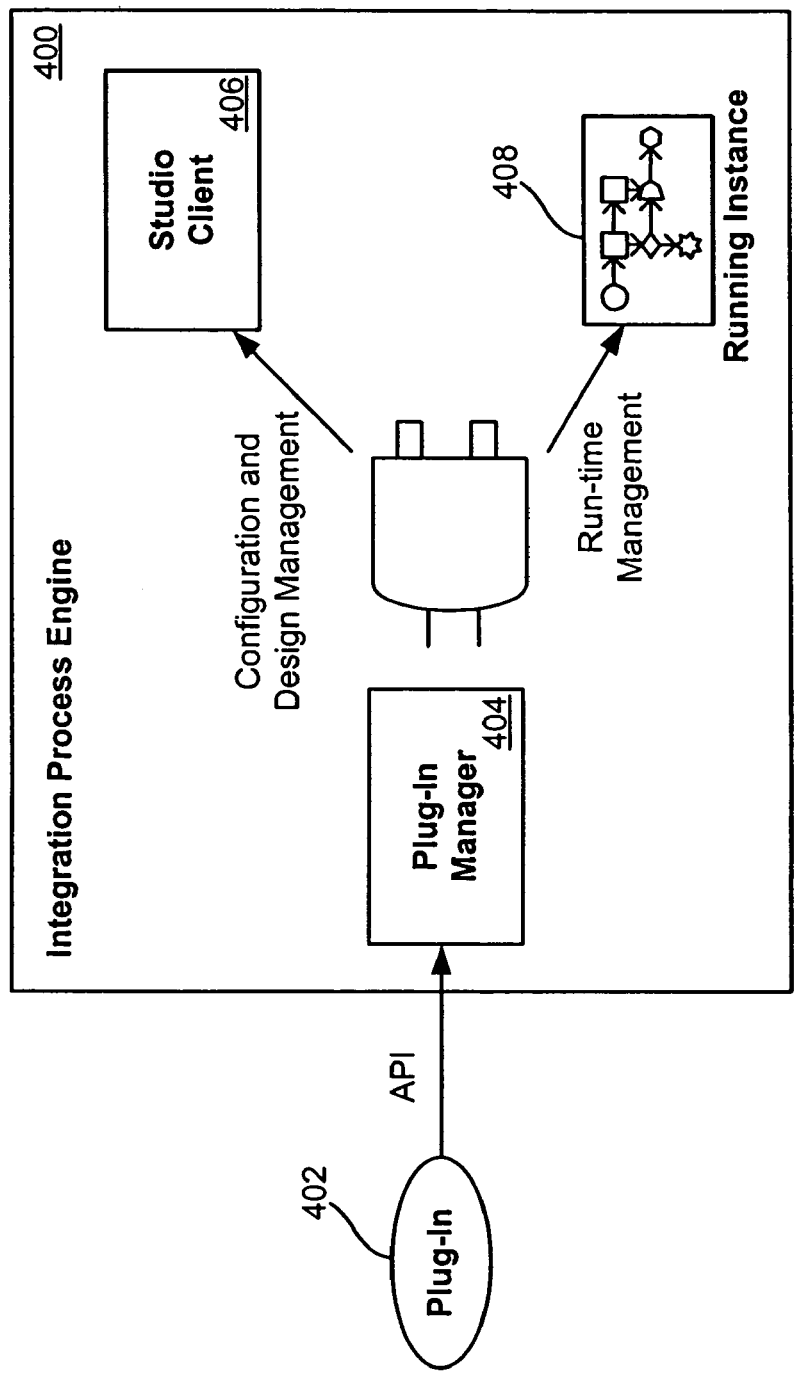
FIG. 4 is an overview of the plug-in manager of FIG. 3.

An overview of the exemplary plug-in manager itself is shown in FIG. 4. A plug-in manager 404, which can be part of the integration process engine 400, can work with a plug-in that is external to the process engine. The plug-in manager can handle configuration and design management for the plug-in, such as by working with an integration studio client 406. The plug-in manager can handle run-time management for the plug-in 402 for a specific running instance 408.

A subset of the configuration and design responsibilities of the plug-in manager can include, for example, supporting the import and export of workflows containing plug-in-specific content, as well as managing the simultaneous loading of multiple plug-ins. Responsibilities can also include enabling the BPM expression evaluator to interpret incoming plug-in data in any format, using common expression grammar; enforcing the dependencies between templates and template definitions, and plug-ins, and handling cases in which the prerequisite plug-ins are not available; enforcing strict type checking during the definition of a business operation that uses plug-in-defined variable types; and providing a generic message-handling facility that enables workflows to respond to an unlimited variety of message-handling data formats and sources.

A subset of the run-time responsibilities of the plug-in manager can include enabling the plug-in to store and retrieve plug-in-specific workflow instance data; preventing the instantiation of a workflow when a required plug-in is not loaded; and supporting custom license checking during initialization. When designing plug-ins, a user can access management features of the plug-in manager using session EJBs such as server.plugin.PluginManager and server.plugin.PluginManagerCfg. These EJBs can be part of the plug-in API.

Discovering a Deployed Plug-In

To make a plug-in available to BPM users, a plug-in can simply be packaged and deployed as a session EJB on the server. The plug-in can provide functionality that enables BPM to detect the plug-in, manage lifecycle tasks and cache information about the plug-in, access the plug-in implementation to read, display, and save the plug-in within the design client, and execute the plug-in at run time.

At startup, the process engine can detect a plug-in via JNDI based on a server.plugin.PluginHome home interface for the plug-in. All plug-in beans can use an interface such as PluginHome as their home interface. Once a plug-in is detected, the plug-in manager can initialize the plug-in using an init( ) method. A plug-in can be initialized once during its lifecycle. The plug-in manager can get information about the plug-in, including configuration and dependency information, using the methods such as getPluginInfo( ) to get basic information about the plug-in, as well as getPluginConfiguration( ) to get default configuration information for the plug-in. The plug-in manager can also use a getDependencies( ) method to get dependencies for the plug-in. The Plug-in Manager can ensure that all dependencies are loaded before loading the plug-in.

The plug-in manager can also load or unload plug-ins, using load( ) or unload( ) methods, respectively, based on their configuration. A plug-in can be available only after it is loaded. When the plug-in is loaded, the Plug-in Manager can call a getPluginCapabilitiesinfo( ) method to get detailed plug-in information, and the plug-in can register for notification messages. At this time, all plug-in classes become visible to the BPM client.

At shutdown, the plug-in manager can unload and de-initialize all deployed plug-ins, using unload( ) and exit( ) methods, respectively. The plug-in can be de-initialized once during its lifecycle. Each of these lifecycle methods can be remote interface methods that are implemented by the plug-in bean.

A plug-in can be required to implement certain classes for each component to define its functionality to the design client. One such class is a plug-in panel class that can be used to define the plug-in GUI component that is displayed in the design client. Another such class is a plug-in data interface to read and save plug-in data.

Because no additional installation may be required on a BPM design client, the design client may have no knowledge of the concrete classes that the plug-in defines. It can be the responsibility of the plug-in to manufacture, upon request, instances of its defined classes. Such a process is referred to herein as object manufacturing. To support object manufacturing a plug-in can implement a method such as a getObject( ) remote interface method.

A design client can use the value objects, obtained and cached by a plug-in manager at startup, to retrieve the plug-in Java class names based on the plug-in component name and ID, and subsequently initiate object manufacturing based on the returned values.

To define plug-in execution characteristics, a user can implement a run-time interface for the plug-in component. At run time, the plug-in can communicate with the process engine and client using a process called context passing. In context passing, a Plug-in Manager can obtain an instance of the plug-in component run-time interface and pass the context to the instance. Each context interface can provide restricted access to the Plug-in Manager, enabling the plug-in to execute and manage its own application logic, and introduce the plug-in instance data into the BPM run-time environment.

BPM Plug-In Development

Figure 6:
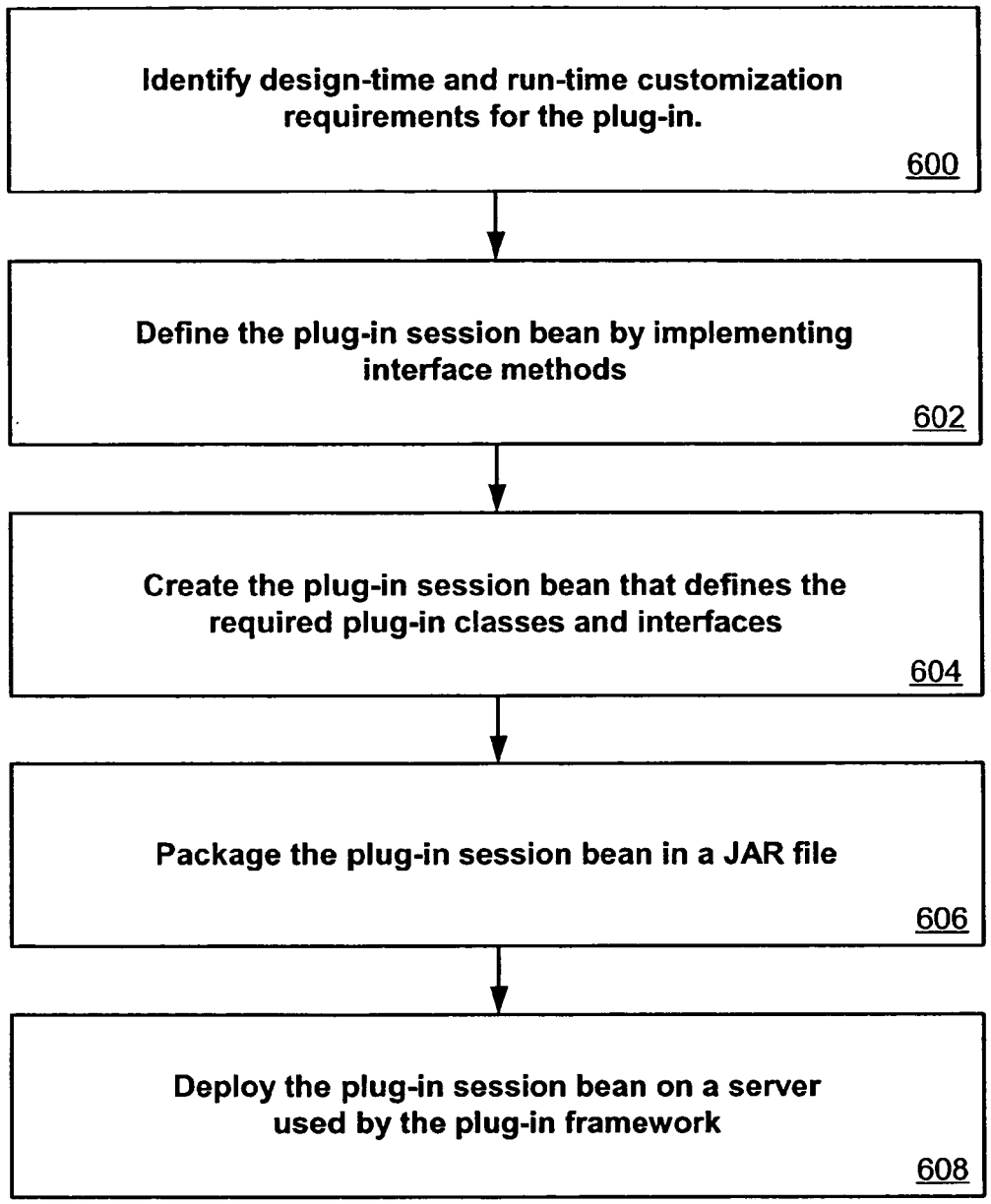
FIG. 6 is a flowchart showing the steps of a method that can be used to develop a plug-in for use with the plug-in framework of FIG. 3.

Exemplary steps that can be followed to develop a BPM plug-in in accordance with one embodiment of the present invention are shown in FIG. 6. The user can initially identify design-time and run-time customization requirements 600. The user can use plug-ins to modify the design and run-time behavior of the workflow components such as Start, Event, and Done nodes; properties of the workflow templates and template definitions; task actions; functions; message types; and variable types.

Next, the user can define the plug-in session EJB 602. This can be done in one embodiment by implementing javax.ejb.SessionBean interface methods, such as ejbActivate( ), ejbPassivate( ), ejbRemove( ), and setSessionContext (SessionContext ctx). The user can then implement a server.plugin.PluginHome home interface ejbCreate( ) method and server.plugin.Plugin remote interface methods. A user can then create a session EJB 604 that defines the required plug-in classes and interfaces. The user can then package the EJB 606, such as by creating a build directory and compiling source files into the directory in order to package the plug-in in a JAR file. Finally, the user can deploy the session EJB 608 on a server used by the plug-in framework.

The user can then define the plug-in component. This can be done by implementing the plug-in data interface to define the methods used for reading and saving the plug-in data. The user can define the plug-in panel class to display the plug-in GUI component within the design client. The user can also define the plug-in run-time component class to define the run-time execution characteristics.

The user can set up notification management, and can implement and register an event handler to process incoming plug-in events. The user can manage the plug-in, customizing the plug-in configuration requirements, if desired. Context-sensitive online help can be developed for the plug-in. Finally, the user can package all plug-in Java classes in EJB JAR and WAR files, and deploy the plug-in.

A set of plug-in classes can be used to represent common plug-in scenarios in one example of a BPM plug-in. Two workflow templates can be used, such as Plug-in Order Processing and Plug-in Order Fulfillment, as well as plug-ins that have been added. The Plug-in Order Processing workflow template includes three plug-in components from the sample plug-in: a Start node that is triggered by a plug-in-defined event, a task action that simulates an inventory check, and an Event node that blocks until an order confirmation message is received. The Plug-in Order Fulfillment workflow template includes two plug-in components from the sample plug-in: a function that calculates the total price of an order and a task action that generates an event message to trigger the Confirm Order event.

To connect to the BPM Plug-in Manager, PluginManager and PluginManagerCfg session EJBs can be used. As with any EJB, to access the PluginManager and/or PluginManagerCfg EJBs, the home and remote interfaces can be used. This can be accomplished by looking up a session EJB home interface in JNDI and creating a remote session object (EJBObject) using the home interface.

A common.plugin package can provide Info classes, or value objects, for obtaining plug-in object data at both definition time and run time. Using plug-in value objects, the process engine and BPM client applications can request plug-in object data for a specified locale, enabling the plug-in to localize display strings and other resources appropriately.

Value objects can play an important role in object manufacturing. Specifically, a BPM design client can use value objects to retrieve, based on the plug-in component name and ID, the names of the Java classes included in the plug-in. A BPM design client can also use value objects to initiate object manufacturing, based on the returned values, to obtain an instance of the defined classes.

To define a plug-in value object, an associated constructor can be used. For each of the plug-in value objects, one or more constructors for creating object data can be provided. The user can pass the plug-in value objects for each of the plug-in components when defining the common.plugin.PluginCapabilitiesInfo object. When creating a value object, the user can specify the plug-in ID, which must be unique for the plug-in and object type. The user can also specify a description of the plug-in features, as well as a globally unique internal identifier, which can be formed by appending one or more dot-separated strings to the vendor reverse-DNS name (for example, com.somedomain.someproduct.myplugin).

A user can also define an array containing the Java class names associated with the plug-in. The design client can retrieve this information using the plug-in name and ID. Subsequently, the design client can initiate object manufacturing to access the implementation classes. The user can also define the icon used by the integration studio to represent the plug-in when the interface view is enabled. Custom icons can be defined when implementing the home interface ejbCreate( ) method.

For example, the following code creates a StartInfo object and assigns the resulting object to si:

```
si = new
StartInfo (SamplePluginConstants.PLUGIN_NAME, 5,
        bundle.getString("startOrderName"),
            bundle.getString("startOrderDesc"),
            ICON_BYTE_ARRAY,
    SamplePluginConstants.START_CLASSES, orderFieldInfo);
```

The START_CLASSES array can define the plug-in data, plug-in panel, and run-time component class names for the plug-in Start node. The START_CLASSES array can be defined within the SamplePluginConstants.java class file as follows:

```
inal static String[ ] START_CLASSES = {
    START_DATA,
    START_PANEL,
    START_NODE };
```

In this example, the array variable values are defined in the SamplePluginConstants.java file, as follows:

```
final static String START_NODE =
    "com.tour.po.plugin.StartNode";
final static String START_DATA =
    "com.tour.po.plugin.StartNodeData";
final static String START_PANEL =
    "com.tour.po.plugin.StartNodePanel";
```

The ICON_BYTE_ARRAY variable can specify a byte array representation of the graphical image (icon) that is used by the studio to represent the plug-in when the studio interface view is enabled. To disconnect from the BPM plug-in manager, session EJB references can be removed to make the system space available for use by other EJBs. Additional resources can also be removed, including any JMS connections, and the context closed.

To define a plug-in session EJB in accordance with one embodiment of the present invention, a user must implement three predefined interfaces: a Session EJB, a Plug-In Home Interface, and a Plug-In Remote Interface. The Session EJB interface can be implemented by all session EJBs. The Plug-In Home Interface can be an extension of the javax.ejb.EJBHome interface, and can define the home interface for all plug-ins. A Plug-In Remote Interface, which can be an extension of the javax. ejb.EJBObject interface, can define the remote interface for all plug-ins.

Defining Plug-In Components

A plug-in can be responsible for enabling the BPM access the plug-in implementation to read, display, and save the plug-in within the design client, as well as executing the plug-in. The user can provide this functionality through the plug-in component. For example, in order to enable the BPM to read or parse and save plug-in data in XML format, the user can implement the plug-in data interface. In order to display the plug-in GUI component within the design client, a plug-in panel class can be defined. To execute the plug-in, a user can define the run-time component class. To enable the plug-in to read or parse incoming data, both the plug-in data interface and run-time component class must implement the load( ) or parsing method of their parent interface, such as common. plugin.PluginObject. Lastly, the user can define the plug-in component value object to describe the component data.

Notifications

BPM can communicate with plug-ins by broadcasting notifications. A notification is a message that the integration process engine sends to a plug-in, indicating that an event has occurred. A user can register a plug-in as a notification listener to receive different types of notifications. One type of notification is an Instance Notification. The instance notification can be used as a workflow instance notification to notify a user of events such as a workflow being aborted, completed, created, deleted, or updated. A Task Notification can be used to notify a user of events such as a task being assigned, completed, executed, overdue, started, unassigned, unmarked as done, or updated. A Template Definition Notification can notify a user of events such as a template definition being created, deleted, or updated. A Template Notification can notify a user of events such as a template being created, deleted, or updated.

A plug-in can register itself as a notification listener at load time. For example, when implementing the load( ) method, a user should register the plug-in as a notification listener, if necessary. To register the plug-in as a notification listener, a user can use one or more of the plug-in manager configuration methods, based on the type of notifications the plug-in is to receive. Plug-in notification registration methods can include addInstanceListener( ), addTaskListener( ), addTemplateDefinitionListener( ), and addTemplateListener( ). Parameters that can be specified for the plug-in notification registration methods Certain parameters may require a user to specify values for the plug-in notification registration method. A "plug-in" parameter can specify the EJBObject implementing the plug-in remote interface. A "mask" parameter can be an integer bitmask specifying the events for which a user wants to register. The mask value can be set to EVENT_NOTIFICATION_ALL or EVENT_NOTIFICATION_NONE to globally register or unregister, respectively, all events in a particular category.

Processing Plug-In Events

An event can be an asynchronous notification from another workflow or from an external source, such as another application. A user can define an event to start a workflow, initialize variables, activate a node in the workflow, or execute an action. A user can define events and event properties when defining Start and Event nodes using the integration studio.

Figure 5:
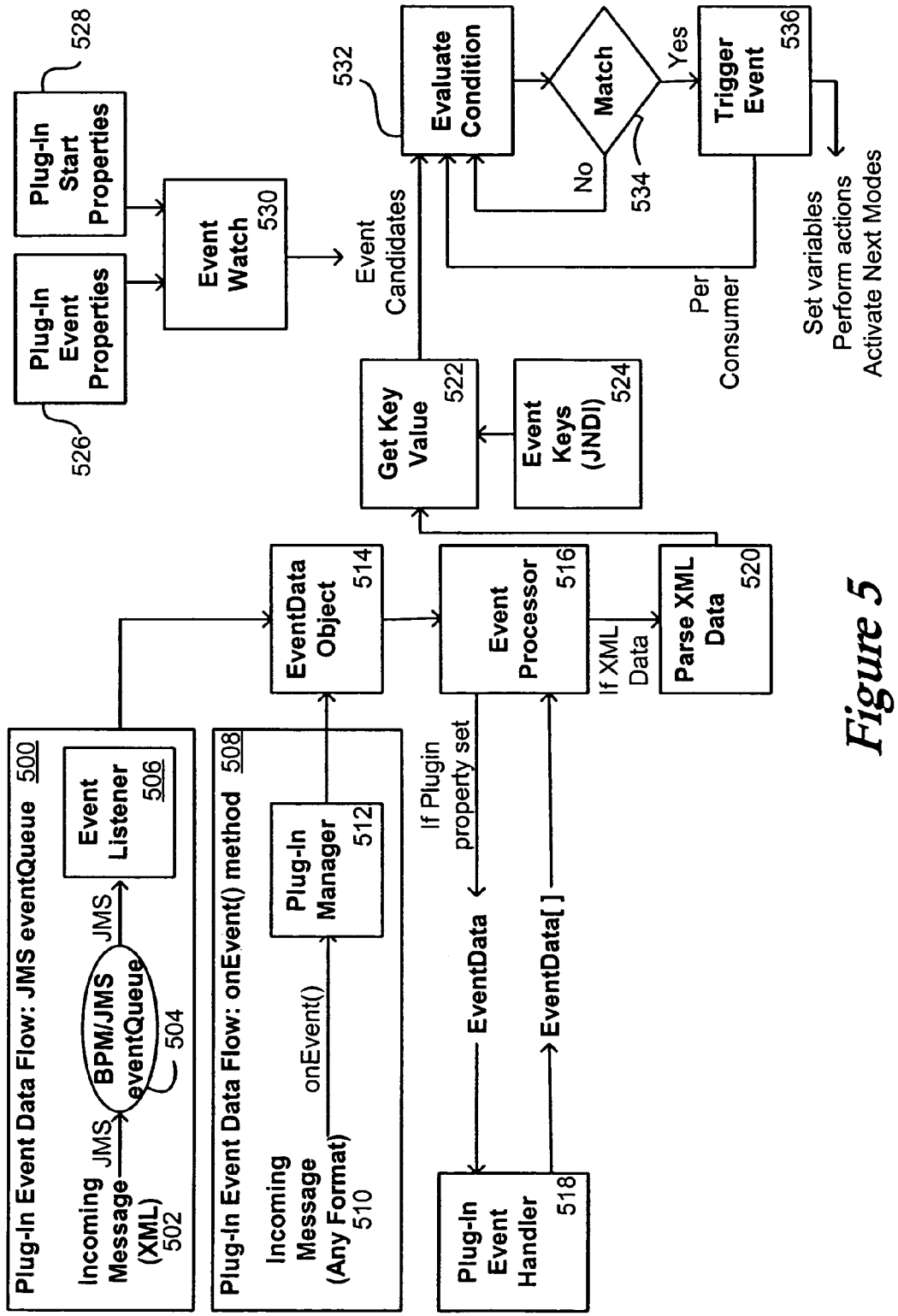
FIG. 5 is a diagram of data flow for plug-in events using the plug-in manager of FIG. 4.

A BPM framework can support event messages in XML format that are delivered via JMS. To support event messages in both XML and non-XML format, a user can define a plug-in event. FIG. 5 illustrates exemplary data flow for plug-in events.

In the Figure, plug-in event messages are passed to the system in one of the following two ways. The first way to process an incoming XML message 502 for a JMS data flow 500 is through a JMS eventQueue 504 provided by BPM. At run time, the event listener 506 listens for events, via the JMS eventQueue 504, which are received in XML format and delivered using JMS. The second way to process an incoming message 510 for an event data flow 508, which can be in any format, is through an on Event( ) method of the plug-in manager 512 EJB. At run time, the Plug-in Manager on Event( ) method can accept any data format specified by the plug-in. The integration process engine can store an incoming plug-in event message as an Event Data object 514, and can pass that object to the Event Processor 516.

Upon receipt of an Event Data object, an Event Processor 516 can first check to see if the Plug-in property is defined as part of the message. The plug-in message property can be defined by defining the properties constructor parameter to the server.eventprocessor.EventData object to include a property named Plugin, or by defining a JMS message property named Plugin.

If the Plugin property is defined, the Event Processor 516 can pre-process the plug-in event data by passing the Event Data object 514 to the plug-in event handler 518. The pre-processed event data can be returned to the Event Processor 516 as an array of Event Data objects. The Event Processor can then check to see if the resulting data is in XML format. If so, the Event Processor can parse the XML event data 520.

At this time, the Event Processor 516 can retrieve the content type and event descriptor supplied by the EventData object. The content type refers to the MIME (Multi-Purpose Internet Mail Exensions) content type, and describes the basic data type of the message. The content type can default to text/XML, indicating that the data is in text format and obeys the rules of XML. The event descriptor provides a precise definition of the data format, and can be interpreted in the context of the content type.

For example, if the content type is set to text/XML, the event descriptor is the XML document type. If a DOCTYPE tag is set, the XML document type can be the public ID or system ID, if defined, or the document element name. If the content type is set to application/x-java-object, specifying a serialized Java object, the event descriptor is the fully-qualified Java class name.

The Event Processor can then retrieve the event key value 522, if specified, and can compare that value to the pre-defined event keys in JNDI 524. An event key can specify the incoming data field that should be treated as the primary key, and can be associated with a particular content type and event descriptor. An event key can provide a filtering mechanism for incoming event data to improve performance.

The Event Processor 516 can search an Event Watch 530 table for possible candidates to receive the event content based on the content type, event descriptor, and event key value. The Event Watch 530 table can accept plug-in event properties 526 and plug-in start properties 528. The Event Processor can evaluate the condition 532, if specified, and can determine if there is a successful match 534. A condition can consist of an expression that evaluates to true or false. A condition can enable users to define multiple workflows for the same event data that they want to process differently, based on the content of the message. For example, the following provides a valid condition if the event data contains a field called Order Amount: "Order Amount>$500.00".

In the event of a match 534, the Event Processor 516 can trigger the event 536 to either start a new instance of a workflow or resume processing of an existing workflow instance. Each of these tasks can be performed for each consumer subscribed to the event. To support plug-in events, a user can define the plug-in event handler to handle plug-in event data. The user can define the custom message types, or plug-in fields, to parse the event data returned by the event handler, and can define the event watch entry.

Deploying a Plug-In

Since a plug-in is a stateless session EJB, it can be deployed like any other EJB. To deploy a plug-in, a user can define the plug-in deployment descriptor files that define the EJB and/or online help deployment properties. Certain deployment descriptor files may need to be defined by a user in order to deploy the plug-in EJB. An ejb-jar.xml deployment descriptor file can be used to specify basic EJB structure, internal dependencies, and application assembly information. A server-ejb-jar.xml deployment descriptor file can be used to specify server caching, clustering, and performance information, and server resource mappings, including security, JDBC pool, JMS connection factory, and other deployed EJB resources. A server-cmp-rdbms-jar.xml deployment descriptor file can be used to specify server container-managed persistence services.

To package the plug-in in a JAR file that will be deployed to the server, a user can create a build directory and compile the source files into this directory using javac. The user can copy the deployment descriptors, such as ejb-jar.xml and server-ejb-jar.xml, into a subdirectory called META-INF in the build directory. A JAR file can be created of the build directory, including the compiled source files and deployment descriptors. The user can run server.ejbc on the JAR file to generate the server container classes. A user can also create a WAR file containing plug-in online help and deployment descriptor files.

Integration Studio

An integration studio that can be used in accordance with one embodiment of the present invention is a client application with a graphical user interface that provides functionality in the three broad areas of workflow design, workflow monitoring, and data administration. For data administration functions, the studio can be used for modeling business units and users of the system, configuring levels of permission for users, rerouting tasks from one user to another for a specified period of time, and creating business calendars that are used to control the execution of workflows.

For workflow design functions, an integration studio can be used for drawing graphical process flow diagrams, defining variables to store run-time data, defining processes to handle run-time exceptions, and defining interfaces to external components.

For workflow monitoring functions, an integration studio can be used for displaying the status of running workflows, modifying the tasks associated with running workflows, such as by reassigning tasks or by forcing work to be redone, displaying the workload status of the system in graphical form, viewing historical data for workflows to identify bottlenecks and inefficiencies, and viewing user or role worklists to maintain workflows dynamically.

In an integration studio, organizational data can be subdivided into three categories: organization, role, and user. An organization category can include an entire company; a division, region, or location within a company; or any other distinction that is relevant to the particular business of a company. A Role category can specify a common area of responsibility, ability, or authorization level that is shared by a group of individuals who belong to a particular organization. A user category can specify an individual assigned to a role who has the necessary permission to perform a particular task in the workflow, such as responding to messages generated by a workflow. Roles can allow groups of users to execute manual tasks according to a generic business role within the organization.

Roles can be defined uniquely within organizations. This approach can allow a user to divide an organization into organizational units, and to re-use role names that can have different groups of users attached to them. Although roles are defined uniquely within organizations, users can belong to one or more organizations, and to one or more roles with those organizations.

Other business data that a user can model include business rules, such as schedules and workflow routings. A user can model working hours and schedules with business calendars that can be associated with organizations, roles, and users. A user can also create routing specifications that redirect activities to different users or roles for specified periods of time.

In an integration studio, business processes can be modeled, diagramed, and saved as workflow templates in a database. These templates can be associated with multiple organizations, and are similar to empty containers that can be used to store different workflow versions. Templates contain template definitions, which serve as different versions of the same workflow, and are distinguished by effective and expiry dates that determine a range of time in which each version may be available for instantiation, that is, placement in the run-time environment.

The template definition is where a user can represent the business processes to be modeled, such as by drawing and connecting shapes that make up the flow. Program control can be represented visually by nodes and connections.

Actions are, in a sense, the basic building blocks of a workflow because they can define the actual behavior of the workflow. An action can be as simple as assigning a task to a user or as complicated as sending XML messages or invoking EJB methods. Actions can be added to nodes, to exception handlers, and even to other actions.

There can be several types of actions. Task actions can be used to assign manual tasks to users and roles, and to control the execution of Task nodes. Workflow actions can be used to manage an entire workflow, such as stopping the current workflow or starting a sub-workflow. Integration actions can be used to integrate the workflow with external software components or applications. This can be done by, for example, calling an executable program or sending an XML message to another application.

Exception handling actions can be used to invoke and exit an exception handler, and to make an exception handler the active one for a workflow. Miscellaneous actions can be used to perform additional actions, such as sending e-mail, making an audit entry, or canceling a workflow event. Custom actions, or plug-ins, can be actions that are programmed for an integration plug-in framework, and that a user can access from the studio.

Variables can be used to hold run-time values and data obtained usually from outside sources, such as Java components and incoming XML documents. Variables can also be set to constant values by workflow actions. Variables can be used by the workflow for several purposes, such as evaluating a condition in a decision node, creating a label for a template definition, or holding workflow run-time information. Many variable types can be supported, including Boolean, Date, Double, Entity EJB, Integer, Java Object, Session EJB, String, and XML. Data types can be extended through the use of plug-in types for the plug-in framework.

Exception handlers can be used to generate, trap, and respond to exception conditions that are generated internally or externally. Exceptions can be abnormal conditions that are identified at design time in the workflow that is to be trapped, or the exceptions can be server exceptions that a user traps and responds to accordingly. Workflows can contain custom-defined exception handlers consisting of a series of actions that a user specifies.

Workflow

Although an integration studio workflow can be used to perform certain business processes directly, such as sending e-mail to a client, or assigning a manual task to a Worklist user, workflows can be designed primarily to integrate external software components, while the workflow definition can serve to control the sequence in which these external program modules are invoked. Thus, before a user can begin to draw a workflow, the user should identify the external components, such as Enterprise JavaBeans, Java classes, or other applications with which the user will need to interface.

BPM can operate at the business-logic layer of a J2EE framework. This means that a workflow can directly integrate business objects, such as Java classes and Enterprise JavaBeans (EJBs). For communication with other components or applications, it can exchange extensible Markup Language (XML) messages via the intermediary of the Java Message Service (JMS).

The entire front-end application, which receives and formats input from an external client, may not be represented in a BPM workflow. Workflow can take control of processing at the point where the Web components need to interact with the EJB layer. A workflow can be started when it is triggered by an external event, such as the arrival of the appropriate XML document on a JMS topic.

XML Documents

To interact, in an asynchronous fashion, with other types of server-side components such as servlets or back-end applications, an integration workflow can share data via XML documents that are published to JMS topics or queues and received from JMS queues. In fact, even to exchange information between multiple workflows in an asynchronous fashion, an integration server can use XML documents posted to an internal topic. Although communication between the workflow and the Worklist client may be accomplished through an integration API, requests and responses can take the form of an XML document.

To communicate with many of the external and even internal components in workflows, it may be necessary to compose and send XML messages to either a worklist client user or an external/internal topic or queue. XML elements and attributes can correspond to workflow variables for which values are provided at run time. Outgoing XML documents can be used to substitute for an XML document, which could be sent by a front-end Web application to trigger an application, such as an order-processing application. Outgoing XML documents can also be used to prompt a worklist user to provide the result of the credit check, as well as to prompt a worklist user to provide correct data for the state to which the order is to be shipped.

XML documents can be embedded within specific workflows, depending on the action that is used to reference them. XML documents can also be exported and imported to and from an XML repository, which stores XML documents, document type definitions (DTDs), and other XML entities outside of a workflow definition, so that documents created in one workflow can be accessed for reuse by another.

When defining a workflow event to listen for incoming XML documents, the document type or root element of the document that the event is expecting can be specified. To filter incoming XML documents so that only those containing particular element or attribute values can trigger the event, an event key can be specified. The event key can identify the document type and element value that is to be extracted from the XML document via an XPath expression. The event key can be stored in a table so that at run time, the server's event processor can compare the value returned from the XML document with the value of a key specified by the event node. If a match is found, the event can be triggered. Examples of event keys used in workflows can include event keys for recognizing an XML message sent to notify that a customer has cancelled an order, as well as to report the arrival of new inventory.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system that includes a computer and a processor, and that provides a plug-in framework for integrating business processes, comprising:

a process engine operating on the computer that includes a workflow stored and executing thereon, wherein the process engine allows applications to interact with business processes, and triggers notifications to the business processes when events occur within the workflow; and a plug-in framework operating on the computer that provides an interface for the applications to interact with the process engine, and that allows an existing workflow to be dynamically modified by plug-ins at run-time, wherein said plug-in framework includes a database store that includes plug-in configuration information and allow plug-ins to be deployed as session beans to the plug-in framework, a plurality of plug-ins defined by the database store as session beans, for use with the process engine, that when packaged and deployed to the process engine as a plug-in at run-time are automatically discovered by the plug-in framework and dynamically modify the workflow process that is currently running on the process engine, by registering listeners for specific notifications, and then executing a workflow functionality when the specific notifications are triggered, and wherein each plug-in communicates with the process engine using context passing to provide an instance of the plug-in component run-time interface and pass the context to that instance, to allow the plug-in to introduce plug-in instance data into the current workflow run-time, a plug-in manager that provides meta-data about deployed plug-ins including the deployed session beans, enables access to plug-in design and run-time components, registers the plug-ins with the workflow, handles the notifications to and from the plug-ins, and provides loading and unloading of plug-ins as necessary to dynamically modify the workflow, and a plug-in API that enables design, development and configuration of the plug-ins and the managing of run-time interactions between the process engine and the deployed plug-ins.

2. The plug-in framework according to claim 1, wherein: the process engine contains the plug-in manager.

3. The plug-in framework according to claim 2, wherein: the plug-in manager can work with plug-ins external to the process engine.

4. The plug-in framework according to claim 1, wherein: the plug-in manager further enables interpretation of incoming plug-in data.

5. The plug-in framework according to claim 1, wherein: the plug-in manager provides run-time management of plug-ins during workflow execution.

6. The plug-in framework according to claim 1, wherein: the plug-in manager stores plug-in configuration information in an integration data store.

7. The plug-in framework according to claim 1, wherein: the process engine further monitors run-time execution and progress.

8. The plug-in framework according to claim 1, further comprising:
a design client for designing plug-in interaction.

9. The plug-in framework according to claim 1, further comprising:
a run-time management client.

10. The plug-in framework according to claim 1, further comprising:
a database store for storing run-time instances.

11. The plug-in framework according to claim 1, further comprising:
a security realm service for supporting security interfaces.

12. The plug-in framework according to claim 1, wherein: the plug-in API includes an Audit session EJB that receives error and audit messages from the process engine.

13. The plug-in framework according to claim 1, wherein: the plug-in API includes an Permission session EJB that enables a user to get and set security permissions for roles and user actions.

14. The plug-in framework according to claim 1, wherein: the plug-in API includes an Admin session EJB that serves as the primary interface for design clients.

15. The plug-in framework according to claim 1, wherein: the plug-in API includes a Catalog session EJB that classifies EJBs deployed on a particular server.

16. The plug-in framework according to claim 1, wherein: the plug-in API includes a Server Properties session EJB that provides clients with information about the properties governing the system.

17. The plug-in framework according to claim 1, wherein: the plug-in API includes a Principal session EJB that provides clients with secure access to the system.

18. The plug-in framework according to claim 1, wherein: the plug-in API includes a plurality of client side classes that provide clients access to the process engine.

19. The plug-in framework according to claim 1, wherein: the plurality of plug-ins includes a plug-in that implements a workflow action that can be used in a B2B integration environment.

20. The plug-in framework according to claim 1, wherein: the plurality of plug-ins includes a plug-in modifies the behavior of Start, Event and Done nodes of a workflow component.

21. The plug-in framework according to claim 1, wherein: the plurality of plug-ins includes a plug-in that triggers the start of a business process by sending an e-mail.

22. The plug-in framework according to claim 1, wherein session beans are automatically discovered by the plug-in framework and wherein the plug-in framework then makes software classes within the session beans available for use by other client applications.

23. The plug-in framework according to claim 22, wherein plug-in session beans include a plug-in home interface and wherein the plug-in session beans are automatically discovered by registering the home interface for each plugin with a JNDI service.

24. The plug-in framework according to claim 23, wherein the plug-in manager obtains information about each plug-in, including configuration and dependency information for that plug-in, and then ensures that all dependencies are loaded in the framework prior to loading that plug-in.

25. The plug-in framework according to claim 1, wherein notifications are broadcast to all plugged in listeners as the workflow operates.

26. The plug-in framework according to claim 1, wherein event messages are broadcast by processing incoming XML messages through a JMS event queue.

27. A computer-implemented method of providing a plug-in framework to integrate business processes, comprising the steps of:
operating a process engine on the computer that includes a workflow stored and executing thereon, wherein the process engine allows applications to interact with business processes, and triggers notifications to the business processes when events occur within the workflow; and
operating a plug-in framework on the computer that provides an interface for the applications to interact with the process engine, and that allows an existing workflow to be dynamically modified by plug-ins at run-time, wherein said plug-in framework includes
a database store that includes plug-in configuration information and allow plug-ins to be deployed as session beans to the plug-in framework,
a plurality of plug-ins defined by the database store as session beans, for use with the process engine, that when packaged and deployed to the process engine as a plug-in at run-time are automatically discovered by the plug-in framework and dynamically modify the workflow process that is currently running on the process engine, by registering listeners for specific notifications, and then executing a workflow functionality when the specific notifications are triggered, and wherein each plug-in communicates with the process engine using context passing to provide an instance of the plug-in component run-time interface and pass the context to that instance, to allow the plug-in to introduce plug-in instance data into the current workflow run-time,
a plug-in manager that provides meta-data about deployed plug-ins including the deployed session beans, enables access to plug-in design and run-time components, registers the plug-ins with the workflow, handles the notifications to and from the plug-ins, and provides loading and unloading of plug-ins as necessary to dynamically modify the workflow,
a plug-in API that enables design, development and configuration of the plug-ins and the managing of run-time interactions between the process engine and the deployed plug-ins; and
allowing applications to interact with the workflow using the plug-in framework.

* * * * *

UNITED STATES PATENT AND TRADEMARK OFFICE
CERTIFICATE OF CORRECTION

| | | |
|---|---|---|
| PATENT NO. | : 7,519,976 B2 | Page 1 of 1 |
| APPLICATION NO. | : 10/404552 | |
| DATED | : April 14, 2009 | |
| INVENTOR(S) | : Blevins | |

It is certified that error appears in the above-identified patent and that said Letters Patent is hereby corrected as shown below:

In column 10, line 42, before "the" delete "an".

In column 14, line 53, delete "javax. ejb.EJBObject" and insert -- javax.ejb.EJBObject --, therefor.

In column 15, line 33, after "methods" insert -- . --.

In column 16, line 20, delete "Exensions)" and insert -- Extensions) --, therefor.

Signed and Sealed this

Eighth Day of June, 2010

David J. Kappos
*Director of the United States Patent and Trademark Office*